United States Patent
Miki et al.

(10) Patent No.: US 10,090,511 B2
(45) Date of Patent: Oct. 2, 2018

(54) SECONDARY BATTERY SYSTEM

(71) Applicants: TOYOTA JIDOSHA KABUSHIKI KAISHA, Toyota-shi, Aichi-ken (JP); KYOTO UNIVERSITY, Kyoto-shi, Kyoto-fu (JP)

(72) Inventors: Hidenori Miki, Hiratsuka (JP); Zempachi Ogumi, Kyoto (JP); Yoshiharu Uchimoto, Kyoto (JP)

(73) Assignees: TOYOTA JIDOSHA KABUSHIKI KAISHA, Toyota-shi, Aichi-ken (JP); KYOTO UNIVERSITY, Kyoto-shi, Kyoto-fu (JP)

( * ) Notice: Subject to any disclaimer, the term of this patent is extended or adjusted under 35 U.S.C. 154(b) by 0 days.

(21) Appl. No.: 15/611,205

(22) Filed: Jun. 1, 2017

(65) Prior Publication Data
US 2017/0352875 A1    Dec. 7, 2017

(30) Foreign Application Priority Data
Jun. 3, 2016 (JP) .................................. 2016-111849

(51) Int. Cl.
*H01M 4/1315*  (2010.01)
*H01M 4/136*   (2010.01)
(Continued)

(52) U.S. Cl.
CPC ......... *H01M 4/1315* (2013.01); *H01M 4/136* (2013.01); *H01M 4/483* (2013.01);
(Continued)

(58) Field of Classification Search
None
See application file for complete search history.

(56) References Cited

FOREIGN PATENT DOCUMENTS

| JP | 2013-145758 A | 7/2013 |
| JP | 2015-191797 A | 11/2015 |

(Continued)

OTHER PUBLICATIONS

Nowroozi et al ("LaSrMnO4: Reversible Electrochemical Intercalation of Fluoride Ions in the Context of Fluoride Ion Batteries", Chemistry of Materials, vol. 29(8), p. 3441-3453. (Year: 2017).*

(Continued)

*Primary Examiner* — Sin J Lee
(74) *Attorney, Agent, or Firm* — Sughrue Mion, PLLC

(57) ABSTRACT

An object of the present disclosure is to provide a secondary battery system that functions at high voltage. The present disclosure attains the object by providing a secondary battery system comprising: a fluoride ion battery including a cathode active material layer, an anode active material layer, and an electrolyte layer formed between the cathode active material layer and the anode active material layer; and a controlling portion that controls charging and discharging of the fluoride ion battery; wherein the cathode active material layer contains a cathode active material with a crystal phase that has a Perovskite layered structure and is represented by $A_{n+1}B_nO_{3n+1-\alpha}F_x$ (A comprises at least one of an alkali earth metal element and a rare earth element; B comprises at least one of Mn, Co, Ti, Cr, Fe, Cu, Zn, V, Ni, Zr, Nb, Mo, Ru, Pd, W, Re, Bi, and Sb; "n" is 1 or 2; "α" satisfies $0 \leq \alpha \leq 3.5$; and "x" satisfies $0 \leq x \leq 5.5$); and the controlling portion controls charging so that a value of F/B in the cathode active material becomes more than 2/n that is in an over-charged state.

3 Claims, 5 Drawing Sheets

(51) Int. Cl.
- H01M 4/48 (2010.01)
- H01M 4/485 (2010.01)
- H01M 4/505 (2010.01)
- H01M 4/525 (2010.01)
- H01M 4/58 (2010.01)
- H01M 4/62 (2006.01)
- H01M 10/05 (2010.01)
- H01M 10/054 (2010.01)
- H01M 10/0562 (2010.01)
- H01M 10/44 (2006.01)
- H01M 6/18 (2006.01)

(52) U.S. Cl.
CPC .......... *H01M 4/485* (2013.01); *H01M 4/505* (2013.01); *H01M 4/525* (2013.01); *H01M 4/582* (2013.01); *H01M 4/62* (2013.01); *H01M 10/05* (2013.01); *H01M 10/054* (2013.01); *H01M 10/0562* (2013.01); *H01M 10/44* (2013.01); *H01M 4/625* (2013.01); *H01M 6/183* (2013.01); *H01M 2300/008* (2013.01)

(56) References Cited

FOREIGN PATENT DOCUMENTS

| | | |
|---|---|---|
| JP | 2015-191797 A5 | 6/2016 |
| WO | 2007/146453 A2 | 12/2007 |
| WO | 2015/146265 A1 | 10/2015 |

OTHER PUBLICATIONS

J.F. Mitchell, et al., "Charge delocalization and structural response in layered $La_{1.2}Sr_{1.8}Mn_2O_7$: Enhanced distortion in the metallic regime", Physical Review B, Jan. 1, 1997, pp. 63-66, vol. 55, No. 1.

* cited by examiner $A_3B_2O_7$ $A_3B_2O_7F_2$ $A_3B_2O_5F_4$

SECONDARY BATTERY SYSTEM

TECHNICAL FIELD

The present disclosure relates to a secondary battery system that works at a high voltage.

BACKGROUND ART

Lithium ion batteries are known as an example of batteries with high voltages and high energy densities. Li ion batteries are cation-based batteries utilizing Li ions as the carriers. On the other hand, fluoride ion batteries utilizing fluoride ions as the carriers are known as an anion-based battery.

For example, Patent Literature 1 discloses an electrochemical cell comprising a cathode, an anode, and an electrolyte material that is capable of conducting anion charge carriers and disposed between the cathode and the anode, wherein the cathode and the anode reversibly exchange the electrolyte material with the anion charge carriers during the charge or discharge of the electrochemical cell. In addition, Patent Literature 1 exemplifies fluoride ions ($F^-$) as the anion charge carriers.

Incidentally, Non Patent Literature 1 discloses $La_{1.2}Sr_{1.8}Mn_2O_7$ as a compound having a Ruddlesden-Popper structure, although the technology does not relate to a fluoride ion battery.

CITATION LIST

Patent Literature

Patent Literature 1: Japanese Patent Application Laid-Open No. 2015-191797

Non Patent Literature

Non Patent Literature 1: J. F. Mitchell et al., "Charge delocalization and structural response in layered La1.2Sr1.8Mn2O7: Enhanced distortion in the metallic regime", Phys. Rev. B 55, 63—Published 1 Jan. 1997

SUMMARY OF DISCLOSURE

Technical Problem

From the viewpoint of allowing a battery to have high density energy, a secondary battery system that works at a high voltage has been demanded. The present disclosure has been made in view of the actual circumstances, and a main object thereof is to provide a secondary battery system that works at a high voltage.

Solution to Problem

To achieve the object, the present disclosure provides a secondary battery system comprising: a fluoride ion battery including a cathode active material layer, an anode active material layer, and an electrolyte layer formed between the cathode active material layer and the anode active material layer; and a controlling portion that controls charging and discharging of the fluoride ion battery, wherein the cathode active material layer contains a cathode active material with a crystal phase that has a Perovskite layered structure and is represented by $A_{n+1}B_nO_{3n+1-\alpha}F_x$ (A comprises at least one of an alkali earth metal element and a rare earth element; B comprises at least one of Mn, Co, Ti, Cr, Fe, Cu, Zn, V, Ni, Zr, Nb, Mo, Ru, Pd, W, Re, Bi, and Sb; "n" is 1 or 2; "$\alpha$" satisfies $0 \leq \alpha \leq 3.5$; and "x" satisfies $0 \leq x \leq 5.5$); and the controlling portion controls charging so that a value of F/B in the cathode active material becomes more than 2/n that is in an over-charged state.

According to the present disclosure, controlling the cathode active material, that is with a Perovskite layered structure and the specific crystal phase, to charge to the over-charged state allows a secondary battery system to work at a high voltage.

In the disclosure, the controlling portion preferably controls discharging so that a value of F/B in the cathode active material becomes less than 2/n.

In the disclosure, the A preferably comprises at least one of Ca, Sr, Ba, Sc, Y, La, Ce, Pr, Nd, Sm, and Gd.

Advantageous Effects of Disclosure

The present disclosure produces effects such that a secondary battery system that works at a high voltage can be provided.

DESCRIPTION OF EMBODIMENTS

The secondary battery system of the present disclosure is hereinafter described in details.

Figure 1:
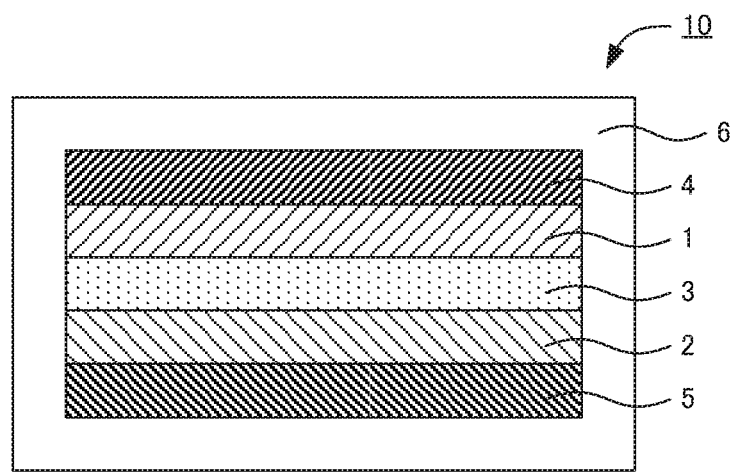
FIG. 1 is a schematic cross-sectional view illustrating an example of the fluoride ion battery in the present disclosure.

FIG. 1 is a schematic cross-sectional view illustrating an example of the fluoride ion battery in the present disclosure. Fluoride ion battery 10 shown in FIG. 1 has cathode active material layer 1 containing a cathode active material, anode active material layer 2 containing an anode active material, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. Cathode active material layer 1 contains the specific cathode active material in the present disclosure.

Figure 2:
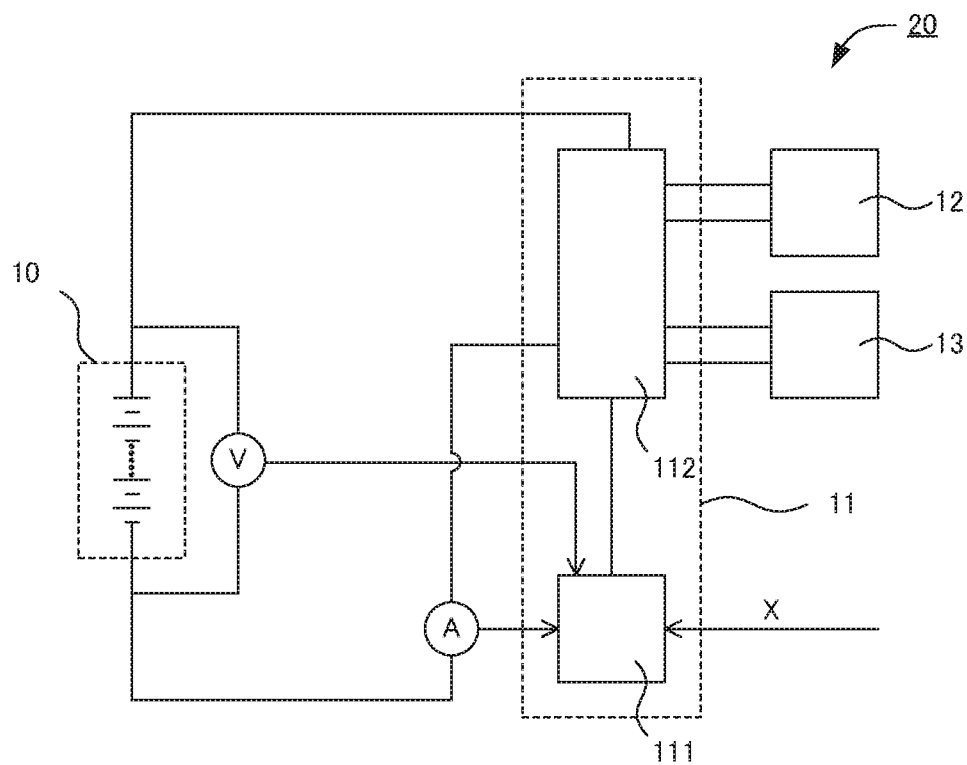
FIG. 2 is a schematic diagram illustrating an example of the secondary battery system of the present disclosure.

FIG. 2 is a schematic diagram illustrating an example of the secondary battery system of the present disclosure. Secondary battery system 20 shown in FIG. 2 comprises at least fluoride ion battery 10 and controlling portion 11 that controls charging and discharging of fluoride ion battery 10. Controlling portion 11 has units such as ECU (Electronic Control Unit) 111 and PCU (Power Control Unit) 112. ECU 111 sends charge and discharge commands (such as the start command and the stop command) to PCU 112, based on request X from outside (such as the charge request or the discharge request) and voltage V and current A of fluoride ion battery 10. PCU 112 supplies electricity to load 12 during discharging, and receives electricity from power source 13 during charging. In the present disclosure, controlling portion 11 features a configuration that controls charging so that the cathode active material charges to the over-charged state.

According to the present disclosure, controlling the cathode active material, that is with a Perovskite layered structure and the specific crystal phase, to charge to the over-charged state allows a secondary battery system to work at a high voltage. For example, a fluoride ion battery using $CuF_2$ as a cathode active material and Ce as an anode active material works at approximately 2.7 V. In contrast, for example, a battery that works at a high voltage of 4 V level was obtained in the later described Example.

Here, most of conventionally known active materials for fluoride ion batteries are metal oxides and their function as active materials appears upon fluorinating and defluorinating reactions of the metals:

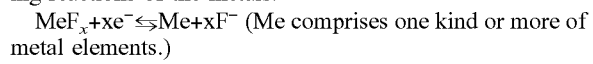

(Me comprises one kind or more of metal elements.)

In contrast, the present inventors have obtained the knowledge from the past research that the active material having a crystal phase represented by $A_{n+1}B_nO_{3n+1}$ shows its function as an active material not by fluorinating and defluorinating reactions but by intercalation and desorption reactions (intercalating reaction). The intercalating reaction is a reaction in which a change of the crystal structure is small; thus, an advantage is the low resistance, and additional advantage is the high cycle properties since the expansion and contraction during the change of the crystal structure is small.

The number of $F^-$ that can be intercalated (the number of Interstitial site) in the crystal phase represented by $A_{n+1}B_nO_{3n+1}$ (n=1, 2) is presumed to be 2 at the maximum, in light of the space in the crystal structure. In particular, presumably, in the case of the crystal phase represented by $A_2BO_4$ that falls under n=1, $F^-$ can be intercalated to the composition of $A_2BO_4F_2$ (F/B=2); in the case of the crystal phase represented by $A_3B_2O_7$ that falls under n=2, $F^-$ can be intercalated to the composition of $A_3B_2O_7F_2$ (F/B=1).

Figure 3A:
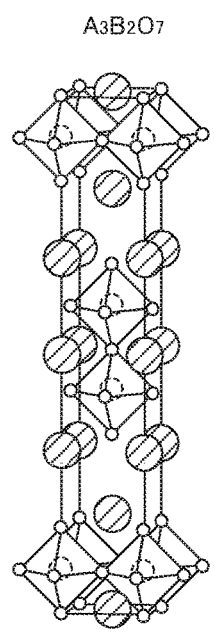
FIGS. 3A to 3C are schematic cross-sectional views illustrating an example of the crystal structure of the cathode active material in the present disclosure.
Figure 3B:
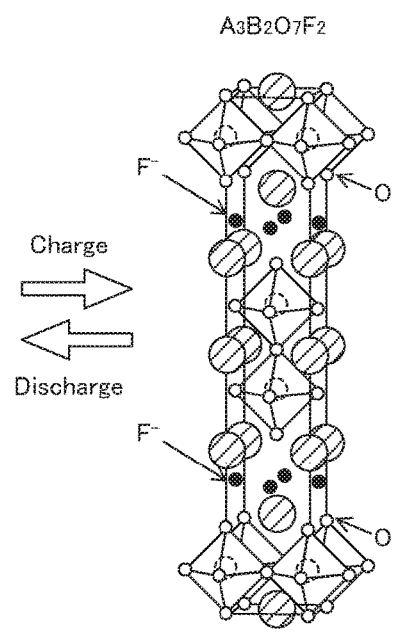

The present inventors have found out that the novel electrode reaction at a high potential would occur if this active material is used as the cathode active material and charged to the condition in which F/B becomes more than 2/n (over-charged state). This point is described with reference to FIGS. 3A to 3C. FIG. 3A is an example of the crystal phase represented by $A_3B_2O_7$. If the active material having such a crystal phase is used as the cathode active material and charged ($F^-$ is intercalated), as shown in FIG. 3B, $F^-$ would be intercalated to the Interstitial site to the composition of $A_3B_2O_7F_2$. After that, if the cathode active material is further charged and becomes over-charged state, as shown in FIG. 3B, the O elements in some parts (such as the O element in the Apical site) are presumed to be substituted with an F element. As the result, the novel electrode reaction at a high potential is presumed to occur. In this manner, the battery system that works at a high voltage may be obtained by controlling charging the cathode active material to the over-charged state. Also, for example, the operation at a normal potential in addition to the operation at a high voltage may improve the capacity. In other words, the energy density of the battery (voltage X capacity) may be dramatically improved. Furthermore, as described above, usage of the active material having the crystal phase represented by $A_{n+1}B_nO_{3n+1}$ allows a secondary battery system with a favorable cycle properties.

The secondary battery system of the present disclosure is hereinafter described in each constitution.

1. Fluoride Ion Battery

The fluoride ion battery in the present disclosure comprises a cathode active material layer, an anode active material layer, and an electrolyte layer formed between the cathode active material layer and the anode active material layer.

(1) Cathode Active Material Layer

The cathode active material layer in the present disclosure is a layer that contains at least a cathode active material. Also, the cathode active material layer may further contain at least one of a conductive material and a binder other than the cathode active material.

The cathode active material layer contains a cathode active material that is with a Perovskite layered structure and a crystal phase represented by $A_{n+1}B_nO_{3n+1-\alpha}F_x$ (A comprises at least one of an alkali earth metal element and a rare earth element; B comprises at least one of Mn, Co, Ti, Cr, Fe, Cu, Zn, V, Ni, Zr, Nb, Mo, Ru, Pd, W, Re, Bi, and Sb; "n" is 1 or 2; "α" satisfies $0 \leq \alpha \leq 3.5$; and "x" satisfies $0 \leq x \leq 5.5$).

The crystal phase is usually a crystal phase with a Ruddlesden-Popper structure or the similar structure thereto. The crystal phase may be determined by a X-ray diffraction measurement (XRD measurement) for example. Also, as described later, the easiness of the intercalation and desorption correlates to the crystal structure; thus, it is presumed that the active material with a Perovskite layered structure and provided with the crystal phase having the specific composition may work at a high voltage regardless of the elements that constitute the crystal structure.

The "A" corresponds to the A site in the Perovskite layered structure, and comprises at least one of an alkali earth metal element and a rare earth element. The total proportion of the alkali earth metal element and the rare earth element in all the A sites is preferably 50% or more, more preferably 70% or more, and further preferably 90% or more. Also, the A may be only an alkali earth metal element, may be only a rare earth element, and may be an alkali earth metal element and a rare earth element. Also, the alkali earth metal element may be one kind and may be two kinds or more. In the same manner, the rare earth element may be one kind, and may be two kinds or more.

Examples of the alkali earth metal element may include Be, Mg, Ca, Sr, Ba, and Ra. Meanwhile, examples of the rare earth element may include Sc, Y, and Ln (Ln is a lanthanoid element). The A is preferably at least one of Ca, Sr, Ba, Sc, Y, La, Ce, Pr, Nd, Sm, and Gd. Also, the A may contain at least Sr. Also, the A may be Sr and La. The proportion of Sr in the A may be 30 mol % or more for example and may be 50 mol % or more.

The "B" corresponds to the B site in the Perovskite layered structure, and comprises at least one of Mn, Co, Ti, Cr, Fe, Cu, Zn, V, Ni, Zr, Nb, Mo, Ru, Pd, W, Re, Bi, and Sb. Incidentally, Mn, Co, Ti, Cr, Fe, Cu, Zn, V, Ni, Zr, Nb, Mo, Ru, Pd, W, and Re fall under transition metal elements. The proportion of the transition metal element in all the B sites is preferably 50% or more, more preferably 70% or more, and further preferably 90% or more. Also, the B may be only the transition metal element. Also, the transition metal element may be one kind, and may be two kinds or more. Also, the B may be at least one of Mn, Co, and Cu.

In the crystal phase, "n" is 1 or 2. Also, in the crystal phase, "α" is the amount of oxygen deficiency, and "α"

satisfies $0 \leq \alpha \leq 3.5$. The "α" may be 0 and may be larger than 0. Also, "α" may be 3 or less, may be 2 or less, and may be 1 or less. Also, in the crystal phase, "x" satisfies $0 \leq x \leq 5.5$. The "x" may be 0, may be larger than 0, and may be larger than 2.2. Also, "x" may be 5 or less, and may be 4 or less.

For example, when "n"=2, the crystal phase may have a peak at the position of $2\theta=23.4°\pm0.5°$, $26.6°\pm0.5°$, $32.1°\pm0.5°$, $32.7°\pm0.5°$, $42.7°\pm0.5°$, $46.9°\pm0.5°$ and $57.9°\pm0.5°$ in an X-ray diffraction measurement using a CuKα ray. Incidentally, these peak positions are the peak positions based on the result of the later described $La_{1.2}Sr_{1.8}Mn_2O_7$; the range of ±0.5° is set so as to determine the similar crystal phase to that of $La_{1.2}Sr_{1.8}Mn_2O_7$. Also, the range of the peak positions may be ±0.3° and may be ±0.1°. The same applies hereinafter in this point.

Also, for example, when "n"=2, the crystal phase may have a peak at the position of $2\theta=22.8°\pm0.5°$, $23.8°\pm0.5°$, $30.5°\pm0.5°$, $33.6°\pm0.5°$, $41.0°\pm0.5°$, $48.2°\pm0.5°$, and $58.0°\pm0.5°$ in an X-ray diffraction measurement using a CuKα ray. Incidentally, these are the peak positions based on the result of the later described $La_{1.2}Sr_{1.8}Mn_2O_7F_2$; the range of ±0.5° is set so as to determine the similar crystal phase to that of $La_{1.2}Sr_{1.8}Mn_2O_7F_2$.

The cathode active material preferably contains the crystal phase as the main body. In particular, the proportion of the crystal phase with respect to all the crystal phases included in the cathode active material is: preferably 50 mol % or more, more preferably 70 mol % or more, and further preferably 90 mol % or more.

The cathode active material is not limited to any particular composition if the composition allows the crystal phase to be obtained. Here, when "n"=1, the crystal phase is represented by $A_2B_1O_{4-\alpha}F_x$. The composition of the cathode active material including this crystal phase is regarded as $A_aB_bC_cF_dX_e$. Incidentally, X is an element other than A, B, O and F.

The "a" is, for example, 1.5 or more, may be 1.7 or more, and may be 1.9 or more. Also, "a" is, for example, 2.5 or less, may be 2.3 or less, and may be 2.1 or less. The "b" is, for example, 0.5 or more, may be 0.7 or more, and may be 0.9 or more. Also, "b" is, for example, 1.5 or less, may be 1.3 or less, and may be 1.1 or less. The "c" is, for example, 1.5 or more, may be 1.7 or more, and may be 1.9 or more. Also, "c" is, for example, 5 or less and may be 4.5 or less.

The "d" may be 0 and may be larger than 0. Also, "d" is, for example, 5.5 or less. The "e" may be 0 and may be larger than 0. Also, "e" is, for example, 3 or less, may be 2 or less, and may be 1 or less.

Meanwhile, when "n"=2, the above described crystal phase is represented by $A_3B_2O_{7-\alpha}F_x$. The composition of the cathode active material including this crystal phase is regarded as $A_fB_gO_hF_iX_j$. Incidentally, X is an element other than A, B, O, and F.

The "f" is, for example, 2.5 or more, may be 2.7 or more, and may be 2.9 or more. Also, "f" is, for example, 3.5 or less, may be 3.3 or less, and may be 3.1 or less. The "g" is, for example, 1.5 or more, may be 1.7 or more, and may be 1.9 or more. Also, "g" is, for example, 2.5 or less, may be 2.3 or less, and may be 2.1 or less. The "h" is, for example, 4.5 or more, may be 4.7 or more, and may be 4.9 or more. Also, "h" is, for example, 8 or less and may be 7.5 or less.

The "i" may be 0 and may be larger than 0. Also, "i" is, for example, 5.5 or less. The "j" may be 0 and may be larger than 0. Also, "j" is, for example, 3 or less, may be 2 or less, and may be 1 or less.

The cathode active material is not limited to any shape, and examples thereof may include a granular shape. The average particle size ($D_{50}$) of the cathode active material is, for example, in a range of 0.1 μm to 50 μm, and preferably in a range of 1 μm to 20 μm. The average particle size ($D_{50}$) of the cathode active material may be, for example, determined by the result of a particle size distribution measurement with a laser diffraction scattering method.

The method for producing the cathode active material is not limited to any particular method if it allows the intended cathode active material to be obtained, and examples thereof may include a solid phase reaction. In the solid phase reaction, a cathode active material is synthesized by heat treating a raw material composition containing the A element, the B element, and the O element so as to cause a solid phase reaction. Further, a fluorinating treatment may be conducted to the obtained cathode active material.

On the other hand, the conductive material to be used for the cathode active material layer is not limited to any material if it has the desired electron conductivity, and examples thereof may include carbon materials. Examples of the carbon material may include carbon blacks such as acetylene black, Ketjen black, furnace black and thermal black; and graphene, fullerene, and carbon nanotube. Also, the binder to be used for the cathode active material is not limited to any material if it is chemically and electronically stable, and examples thereof may include fluorine-based binders such as polyvinylidene fluoride (PVDF) and polytetra fluoroethylene (PTFE).

The content of the cathode active material in the cathode active material layer is preferably larger from the viewpoint of the capacity, and the content is, for example, 30 weight % or more, preferably 50 weight % or more, and more preferably 70 weight % or more. Also, the thickness of the cathode active material layer may vary greatly with the constitution of the battery, and thus is not limited to any particular thickness.

(2) Anode Active Material Layer

The anode active material layer in the present disclosure is a layer that contains at least an anode active material. Also, the anode active material layer may contain at least one of a conductive material and a binder other than the anode active material.

Any active material that has lower potential than that of the cathode active material may be selected as the anode active material in the present disclosure. Examples of the anode active material may include a simple substance of metal, an alloy, a metal oxide, and fluorides thereof. The metal element to be contained in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Above all, the anode active material is preferably La, $LaF_x$, Ce, $CeF_x$, Mg, $MgF_x$, Ca, $CaF_x$, Al, and $AlF_x$. Incidentally, the "x" is a real number larger than O.

Regarding the conductive material and the binder, the same materials described in "(1) Cathode active material layer" above may be used. Also, the content of the anode active material in the anode active material layer is preferably larger from the viewpoint of the capacity, and the content is, for example, 30 weight % or more, preferably 50 weight % or more, and more preferably 70 weight % or more. Also, the thickness of the anode active material layer may vary greatly with the constitution of the battery, and thus is not limited to any particular thickness.

(3) Electrolyte Layer

The electrolyte layer in the present disclosure is a layer to be formed between the cathode active material layer and the anode active material layer. The electrolyte material that constitutes the electrolyte layer may be an electrolyte solution (liquid electrolyte) and may be a solid electrolyte material.

The liquid electrolyte in the present disclosure contains a fluoride salt and an organic solvent for example. Examples of the fluoride salt may include inorganic fluoride salts, organic fluoride salts, and ionic solutions. Examples of the inorganic fluoride salt may include XF (X is Li, Na, K, Rb or Cs). Examples of the cations for the organic fluoride salt may include alkylammonium cations such as tetramethylammonium cation. The concentration of the fluoride salt in the liquid electrolyte is, for example, in a range of 0.1 mol % to 40 mol %, and preferably in a range of 1 mol % to 10 mol %.

The organic solvent of the liquid electrolyte is usually a solvent that dissolves the fluoride salt. Examples of the organic solvent may include glyme such as triethylene glycol dimethyl ether (G3) and tetraethylene glycol dimethyl ether (G4), cyclic carbonates such as ethylene carbonate (EC), fluoroethylene carbonate (FEC), difluoroethylene carbonate (DFEC), propylene carbonate (PC) and butylene carbonate (BC), and chain carbonates such as dimethyl carbonate (DMC), diethyl carbonate (DEC), and ethyl methyl carbonate (EMC). Also, an ionic solution may be used as the organic solvent.

On the other hand, examples of the solid electrolyte material may include fluorides of lanthanoid elements such as La and Ce, fluorides of alkali elements such as Li, Na, K, Rb, and Cs, and fluorides of alkali earth elements such as Ca, Sr, and Ba. Specific examples thereof may include the fluoride of La and Ba (such as $La_{0.9}Ba_{0.1}F_{2.9}$) and the fluoride of Pb and Sn.

Also, the thickness of the electrolyte layer in the present disclosure may vary greatly with the constitution of the battery, and thus is not limited to any particular thickness.

(4) Other Constitutions

The fluoride ion battery in the present disclosure comprises at least the above described anode active material layer, cathode active material layer, and electrolyte layer, and usually further comprises a cathode current collector for collecting currents of the cathode active material layer, and an anode current collector for collecting currents of the anode active material layer. Examples of the shape of the current collectors may include a foil shape, a mesh shape, and a porous shape. Also, the fluoride ion battery may comprise a separator between the cathode active material layer and the anode active material layer. The reason therefor is to obtain a battery with higher safety.

(5) Fluoride Ion Battery

The fluoride ion battery in the present disclosure is usually a secondary battery so as to be repeatedly charged and discharged and useful as a car mounted battery for example. Also, examples of the shape of the fluoride ion battery may include a coin shape, a laminate shape, a cylindrical shape, and a square shape.

2. Controlling Portion

The controlling portion in the present disclosure has a function to control charging and discharging of the fluoride ion battery. An example of the controlling portion is controlling portion 11 shown in FIG. 2, which has ECU (Electronic Control Unit) 111 and PCU (Power Control Unit) 112. The ECU preferably includes a micro controller (MCU). Also, the PCU preferably includes a convertor and an inverter, and may further include a cooling structure.

In particular, the controlling portion controls charging so that the value of F/B in the cathode active material becomes more than 2/n that is an over-charged state. Here, in the crystal phase represented by $A_{n+1}B_nO_{3n+1-\alpha}F_x$, the number of F increases and decreases due to charging and discharging. Specifically, the number of F increases due to charging, and the number of F decreases due to discharging. In light of the space in the crystal structure, the number of $F^-$ that can be intercalated in the crystal phase represented by $A_{n+1}B_nO_{3n+1-\alpha}F_x$ (n=1, 2) is presumed to be 2 at the maximum. Accordingly, the state where the proportion of F with respect to B (F/B) is 2/n may be considered as the upper limit of the normal charged-state, and the state where the value of F/B becomes more than 2/n may be considered as the over-charged state. In the present disclosure, the secondary battery system that works at a high voltage may be obtained by intentionally overcharging to have the value of F/B become more than 2/n.

If "n"=1, the cathode active material may be charged to have the value of F/B become more than 2.2, may be charged to have the value of F/B become 3.0 or more, and may be charged to have the value of F/B become 3.6 or more. Meanwhile, if "n"=2, the cathode active material may be charged to have the value of F/B become more than 1.1, may be charged to have the value of F/B become 1.5 or more, and may be charged to have the value of F/B become 1.8 or more.

The controlling portion preferably controls discharging so that the value of F/B in the cathode active material becomes less than 2/n. Utilizing the discharge capacity from the normal state (such as the discharge capacity in FIG. 3B to that in FIG. 3A) in addition to the discharge capacity from the over-charged state allows a secondary battery system with high capacity to be obtained. If "n"=1, the cathode active material may be discharged to have the value of F/B become 1 or less, may be discharged to have the value of F/B become 0.6 or less, and may be discharged to have the value of F/B become 0.2 or less. Meanwhile, if "n"=2, the cathode active material may be discharged to have the value of F/B become 0.5 or less, may be discharged to have the value of F/B become 0.3 or less, and may be discharged to have the value of F/B become 0.1 or less.

Also, the potential of the cathode active material is regarded as $V_c$, and the potential of the cathode active material in the state where F/B=2/n is regarded as $V_\alpha$. For example, in ECU 111 shown in FIG. 2, a range of $V_{min}$ to $V_{max}$ is stored as the specific potential range of the cathode active material. Discharging stops when $V_c$ is dropped to $V_{min}$ by discharging, and charging stops when $V_c$ reaches at $V_{max}$ by charging.

In the present disclosure, usually, the condition of $V_\alpha < V_{max}$ is set. In other words, the cathode active material is charged so that $V_c$ becomes more than $V_\alpha$. Thereby, a secondary battery system that works at a high voltage may be obtained. Both when "n"=1 and when "n"=2, the cathode active material is preferably charged so as $V_c$ becomes 3.5 V (vs $Pb/PbF_2$) or more, and more preferably charged so as $V_c$ becomes 4 V (vs $Pb/PbF_2$) or more.

Meanwhile, in the present disclosure, the condition of $V_{min} < V\alpha$ is preferably set. In other words, the cathode active material is preferably discharged so that $V_c$ becomes less than $V_\alpha$. Both when "n"=1 and when "n"=2, the cathode active material is preferably discharged so as $V_c$ becomes −1.5 V (vs $Pb/PbF_2$) or less, and more preferably discharged so as $V_c$ becomes −2 V (vs $Pb/PbF_2$) or less.

The current density during the charge is not limited to any particular density; for example, it is in a range of 1 $\mu A/cm^2$ to 300 $\mu A/cm^2$ and preferably in a range of 1 $\mu A/cm^2$ to 100 $\mu A/cm^2$.

3. Secondary Battery System

The secondary battery system of the present disclosure comprises the above described fluoride ion battery and controlling portion. The fluoride ion battery before the first charge and discharge (upon the battery assembling) may be any of (i) in the form the anode active material contains a F element but the cathode active material does not contain a F element, (ii) in the form both the anode active material and the cathode active material contain a F element, or (iii) in the form the anode active material does not contain a F element but the cathode active material contains a F element.

In the case (i), for example, as shown in FIG. 3A, the fluoride ion battery is produced using the cathode active material that does not contain a F element. In this case, usually, the anode active material contains a F element, and it is preferable to reach at the state of FIG. 3C via the state of FIG. 3B by the later charge.

In the case (ii), for example, as shown in FIG. 3B, the fluoride ion battery is produced using the cathode active material that contains F elements. In this case, usually, the anode active material contains a F element, and it is preferable to reach at the state of FIG. 3C by the later charge.

Figure 3C:
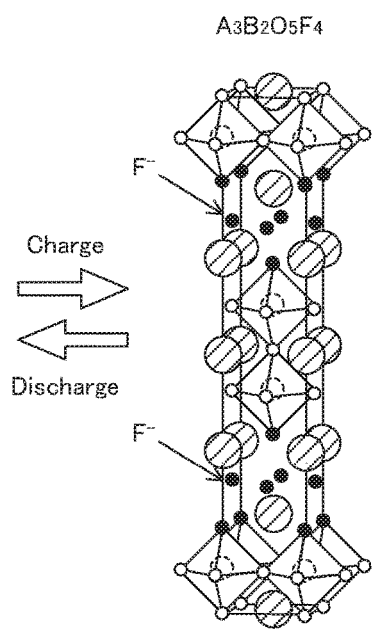

In the case (iii), for example, as shown in FIG. 3C, the fluoride ion battery is produced using the cathode active material that excessively contains F elements. In this case, the anode active material preferably does not contain a F element. It is preferable to reach at the state of FIG. 3A via the state of FIG. 3B by the later discharge. Also, it is preferable to reach at the state of FIG. 3C via the state of FIG. 3B by the later charge.

Also, as described above, it may be thought that the upper limit of the normal charged state is when the value of F/B in the cathode active material is 2/n. The anode active material preferably contains a F element in this state. The reason therefor is to easily cause the later over-charge. If "n"=1, the anode active material preferably contains a F element in the state where the value of F/B being 2.2, 3.0, or 3.6. If "n"=2, the anode active material preferably contains a F element in the state where the value of F/B being 1.1, 1.5, or 1.8.

Incidentally, the present disclosure is not limited to the embodiments. The embodiments are exemplification, and other variations are intended to be included in the technical scope of the present disclosure if it has substantially the same constitution as the technical idea described in the claim of the present disclosure and offers similar operation and effect thereto.

EXAMPLES

The present disclosure is hereinafter described in more details with reference to Examples.

Example 1

(Synthesis of Active Material)

Weighed were 1.9403 g of $La_2O_3$, 2.6372 g of $SrCO_3$, and 1.5679 g of $Mn_2O_3$. These were mixed by an agate motor to obtain the mixture. The obtained mixture was projected into a boat made of alumina and burned at 1400° C. using a tube furnace. The conditions for burning were to raise temperature to 1400° C. taking 140 minutes and to maintain 1400° C. for 20 hours. After that, the mixture was cooled down to a room temperature and then crushed and mixed by an agate motor. The crushed and mixed sample was burned in the same conditions again, thereafter cooled down to a room temperature, and then crushed and mixed by an agate motor. Thereby, an active material ($La_{1.2}Sr_{1.3}Mn_2O_7$) was obtained.

(Treatment for Fluorinating Active Material)

The obtained active material and PVDF (polyvinylidene fluoride) were projected into a different boat and disposed in the same furnace. After that, the temperature was raised to 400° C. taking 40 minutes, maintained for 12 hours, and thereafter naturally cooled down. The sample after the cool down was crushed and mixed by an agate motor. Thereby, an active material that contained fluorine ($La_{1.2}Sr_{1.8}Mn_2O_7F_2$) was obtained.

(Production of Battery)

A battery was produced using the obtained active material ($La_{1.2}Sr_{1.8}Mn_2O_7F_2$) as the cathode active material. The cathode active material, $La_{0.9}Ba_{0.1}F_{2.9}$ which was a fluoride ion conductive material, and VGCF which was an electron conductive material were weighed so as to be the cathode active material:the fluoride ion conductive material:electron conductive material=30:60:10 in the weight ratio and mixed by ball milling (600 rpm, 20 hours) to obtain a cathode mixture. Also, $LaF_3$ was prepared as the anode active material. The anode active material was vacuum-dried at 100° C. over night and thereafter crushed by ball milling (600 rpm, 20 hours). Also, $La_{0.9}Ba_{0.1}F_{2.9}$ was prepared as the material for the solid electrolyte layer. These materials were formed into a pellet to produce a battery.

[Evaluation]

(Cyclic Voltammetry Measurement)

Figure 4:
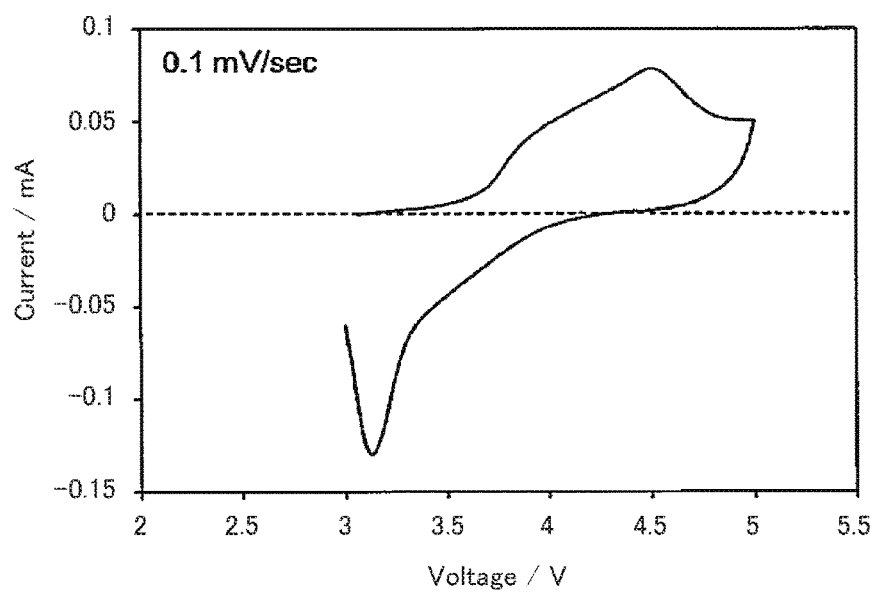
FIG. 4 is the result of a CV measurement for the battery obtained in Example 1.

A CV measurement was conducted for the battery obtained in Example 1 in a cell heated to 150° C. The conditions for the CV measurement were at a room temperature and the sweeping speed of 0.1 mV/s. The result is shown in FIG. 4. As shown in FIG. 4, the peak of the oxidation current appeared in the vicinity of 4.5 V, and the peak of the reduction current appeared in the vicinity of 3.1 V. From the average value of both, it was confirmed that the battery would work at the average voltage of 3.8 V. In this manner, a high voltage battery with the average voltage of 3.8 V or more (4 V level) was obtained.

(Charge and Discharge Test)

Figure 5:
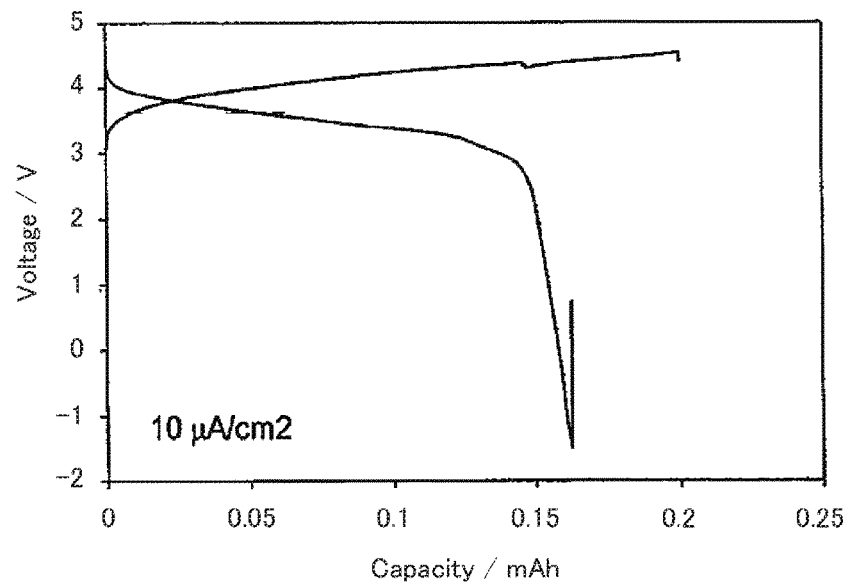
FIG. 5 is the result of a charge and discharge test for the battery obtained in Example 1.

A charge and discharge test was conducted for the battery obtained in Example 1 in a cell heated to 150° C. The conditions for the charge and discharge test were from −1.5 V to 4.3 V (voltage) and the constant current charge and discharge at 10 μA/cm². The result is shown in FIG. 5. In FIG. 5, the charge was conducted first so that $F^-$ contained in the anode active material ($LaF_3$) was conducted through the solid electrolyte layer and moved to the cathode active material ($La_{1.2}Sr_{1.8}Mn_2O_7F_2$). Thereby, the cathode active material became the over-charged state to have high voltage. In FIG. 5, a plateau appeared in the vicinity of 3.5 V to 4.5 V in the charge curve, and the occurrence of the charging reaction was confirmed. The discharge was conducted next, so that $F^-$ contained in the cathode active material was conducted through the solid electrolyte layer and moved to the anode active material. In FIG. 5, a plateau appeared in the vicinity of 3 V to 4V in the discharge curve, and the occurrence of the discharging reaction was confirmed. In this manner, in the battery obtained in Example 1, the charge and discharge reactions proceeded at a high voltage not conventionally seen.

Incidentally, since the cathode active material ($La_{1.2}Sr_{1.8}Mn_2O_7F_2$) used in Example 1 contained a F element, this cathode active material might function as an active material even when F was released therefrom (when X>0 in $La_{1.2}Sr_{1.8}Mn_2O_7F_{2-x}$); however, the plateau did not appear in FIG. 5. The reason therefor was presumed to be as follows: the anode active material (LaF$_3$) also contained F elements, and the anode active material presumably could not receive additional F$^-$. In other words, in the first charge, F$^-$ contained in the anode active material (LaF$_3$) moved to the cathode side. The anode active material might receive as much F$^-$ as that moved to the cathode side; however, when the anode active material became LaF$_3$, it could not receive additional F$^-$ and thus the battery reaction did not proceed further. As the result, it was presumed that the battery reaction did not proceed until when x>0 in La$_{1.2}$Sr$_{1.8}$Mn$_2$O$_7$F$_{2-x}$.

(XRD Measurement)

Figure 6:
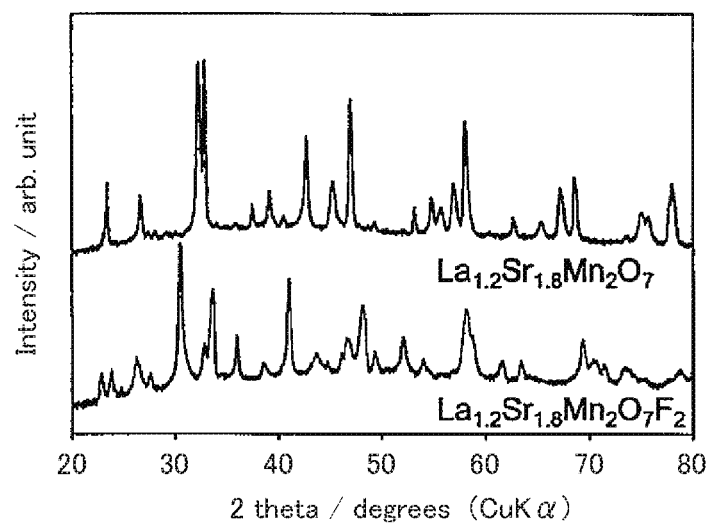
FIG. 6 is the result of an XRD measurement for the cathode active material obtained in Example 1.

An XRD measurement (using a CuKα ray) was conducted for the active material in Example 1 before and after the fluorinating treatment. The result is shown in FIG. 6. As shown in FIG. 6, before the fluorinating treatment, the characteristic peaks were confirmed at positions of 2θ=23.4°, 26.6°, 32.1°, 32.7°, 42.7°, 46.9°, and 57.9°. It meant that the active material having almost the single phase of La$_{1.2}$Sr$_{1.8}$Mn$_2$O$_7$ phase was synthesized. Also, after the fluorinating treatment, the characteristic peaks were confirmed at positions of 2θ=22.8°, 23.8°, 30.5°, 33.6°, 41.0°, 48.2°, and 58.0°; thus, it was confirmed that La$_{1.2}$Sr$_{1.8}$Mn$_2$O$_7$F$_2$ phase was formed.

Example 2

(Synthesis of Active Material)

Weighed were 3.258 g of La$_2$O$_3$, 2.953 g of SrCO$_3$, and 1.579 g of Mn$_2$O$_3$. These were mixed by an agate motor to obtain the mixture. The obtained mixture was projected into a boat made of alumina and burned at 1400° C. using a tube furnace. The conditions for burning were to raise temperature to 1400° C. taking 140 minutes and to maintain 1400° C. for 20 hours. After that, the mixture was cooled down to a room temperature and then crushed and mixed by an agate motor. The crushed and mixed sample (5.2 g) was burned in the same conditions again, thereafter cooled down to a room temperature, and then crushed and mixed by an agate motor. Thereby, an active material (LaSrMnO$_4$) was obtained.

(Production of Battery)

A battery was produced using the obtained active material (LaSrMnO$_4$) as the cathode active material. The cathode active material, La$_{0.9}$Ba$_{0.1}$F$_{2.9}$ which was a fluoride ion conductive material, and VGCF (vapor-grown carbon fiber) which was an electron conductive material were weighed so as to be the cathode active material:the fluoride ion conductive material:electron conductive material=30:60:10 in the weight ratio and mixed by ball milling (100 rpm, 20 hours) to obtain a cathode mixture. Also, PbSnF$_4$ was prepared as the anode active material, and this anode active material and AB (acetylene black) which was an electron conductive material were mixed by ball milling (600 rpm, 20 hours) to obtain an anode mixture. Also, La$_{0.9}$Ba$_{0.1}$F$_{2.9}$ was prepared as the material for the solid electrolyte layer. These materials were formed into a pellet to produce a pellet battery. Incidentally, a Pb foil was disposed on the anode current collector side of the anode active material layer.

[Evaluation]

Figure 7:
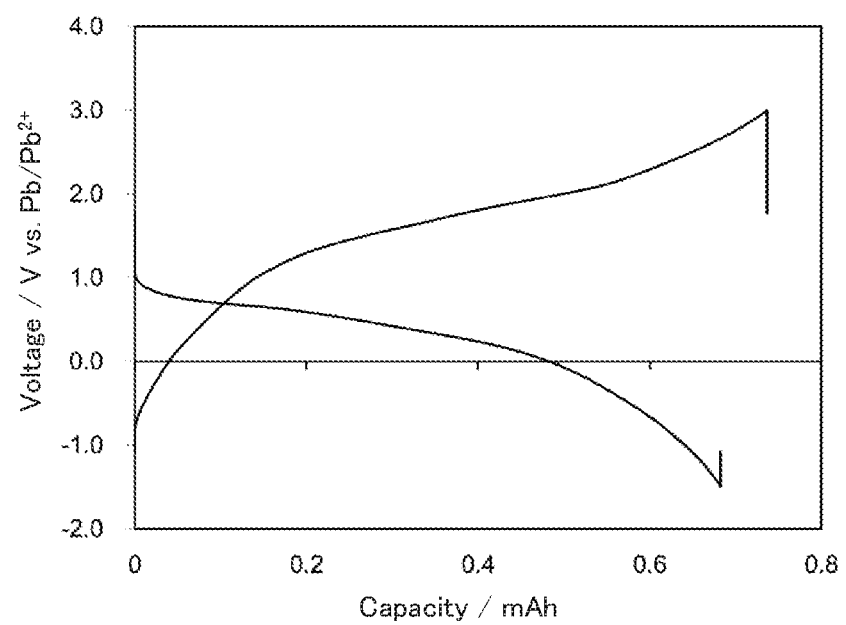
FIG. 7 is the result of a charge and discharge test for the battery obtained in Example 2.

A charge and discharge test was conducted for the battery obtained in Example 2 in a cell heated to 150° C. The conditions for the charge and discharge test were from −1.5 V to 3.0 V (vs. Pb/Pb$^{2+}$) and the constant current charge and discharge at 30 μA/cm$^2$. The result is shown in FIG. 7. As shown in FIG. 7, the charge capacity was about 0.7 mAh, and it was about 225 mAh/g if it was calculated as the specific capacity. This is over the theoretical capacity 115 mAh/g of the reaction in which LaSrMnO$_4$F$_2$ was obtained from LaSrMnO$_4$. Accordingly, it was suggested that F$^-$ was excessively intercalated into the cathode active material. Incidentally, if LaSrMnO$_2$F$_4$ is presumed to be obtained from LaSrMnO$_4$, the theoretical capacity is 310 mAh/g. Also, if the anode active material is changed to LaF$_3$ as in Example 1, since the potential of LaF$_3$ (vs Pb/PbF$_2$) is −2.4 V compared to 0 V of PbSnF$_4$, it is suggested that the charge and discharge reaction would proceed at a high voltage in the same manner as in Example 1.

REFERENCE SIGNS LIST 1 cathode active material layer
2 anode active material layer
3 electrolyte layer
4 cathode current collector
5 anode current collector
6 battery case
10 fluoride ion battery
11 controlling portion
12 load
13 power source
20 secondary battery system

What is claimed is:

1. A secondary battery system comprising:
    a fluoride ion battery including a cathode active material layer, an anode active material layer, and an electrolyte layer formed between the cathode active material layer and the anode active material layer, and
    a controlling portion that controls charging and discharging of the fluoride ion battery, wherein
    the cathode active material layer contains a cathode active material with a crystal phase that has a Perovskite layered structure and is represented by $A_{n+1}B_nO_{3n+1-\alpha}F_x$ (A comprises at least one of an alkali earth metal element and a rare earth element; B comprises at least one of Mn, Co, Ti, Cr, Fe, Cu, Zn, V, Ni, Zr, Nb, Mo, Ru, Pd, W, Re, Bi, and Sb; "n" is 1 or 2; "α" satisfies 0≤α≤3.5; and "x" satisfies 0≤x≤5.5), and
    the controlling portion controls charging so that a value of F/B in the cathode active material becomes more than 2/n that is in an over-charged state.

2. The secondary battery system according to claim 1, wherein the controlling portion controls discharging so that a value of F/B in the cathode active material becomes less than 2/n.

3. The secondary battery system according to claim 1, wherein the A comprises at least one of Ca, Sr, Ba, Sc, Y, La, Ce, Pr, Nd, Sm, and Gd.

* * * * *